US006628030B2

(12) United States Patent
Harada et al.

(10) Patent No.: US 6,628,030 B2
(45) Date of Patent: Sep. 30, 2003

(54) DIRECT CURRENT MOTOR USING MAGNETS WITH EXTENSIONS

(75) Inventors: Hiroyuki Harada, Hamamatsu (JP); Takeshi Tanaka, Toyohashi (JP)

(73) Assignee: Asmo Co., Ltd., Shizuoka (JP)

(*) Notice: Subject to any disclaimer, the term of this patent is extended or adjusted under 35 U.S.C. 154(b) by 0 days.

(21) Appl. No.: 09/995,725

(22) Filed: Nov. 29, 2001

(65) Prior Publication Data

US 2002/0033648 A1 Mar. 21, 2002

Related U.S. Application Data

(62) Division of application No. 09/536,401, filed on Mar. 28, 2000, now Pat. No. 6,342,744.

(30) Foreign Application Priority Data

May 21, 1999 (JP) .......................................... 11-142042
Jul. 16, 1999 (JP) .......................................... 11-203769
Sep. 24, 1999 (JP) .......................................... 11-270566

(51) Int. Cl.[7] ................................................ H02K 23/04
(52) U.S. Cl. .............................. 310/154.29; 310/154.28
(58) Field of Search .......... 310/154.12, 154.22–154.29, 310/156.38–156.46, 156.49, 156.54, 154.21; 29/596–598

(56) References Cited

U.S. PATENT DOCUMENTS 4,703,210 A * 10/1987 Abukawa et al. ........... 310/154
5,204,569 A * 4/1993 Hino et al. ................. 310/154
5,677,587 A * 10/1997 Sakashita et al. ........... 310/154
6,076,554 A * 6/2000 Jensen et al. .......... 137/625.47
6,155,421 A * 12/2000 Cooper ....................... 206/400
6,446,666 B1 * 9/2002 Wadsworth et al. ........ 137/556

FOREIGN PATENT DOCUMENTS

JP 5-168209 7/1993
JP 5-176509 7/1993
JP 5-176510 7/1993

* cited by examiner

*Primary Examiner*—Tran Nguyen
(74) *Attorney, Agent, or Firm*—Posz & Bethards, PLC

(57) ABSTRACT

A direct current motor is comprised of an armature, magnets arranged to face each other through the armature, a commutator and brushes. The armature has a core and a plurality of coils wound on the core. Each magnet has a main part and an extension extending form the main part. The main part has an angular interval which corresponds to an interval of winding each coil, so that the extension is positioned outside the coil in the circumferential direction. During the commutation period of the coil, that is, during shorting of the coil by the brush, the amount of magnetic flux passing through the coil is changed by the extension of the magnet. Thus, an induction voltage is generated in the coil to counteract to a reactance voltage of the coil.

12 Claims, 8 Drawing Sheets

14a 14b W 14 W S L 16 14b 14a 14

DIRECT CURRENT MOTOR USING MAGNETS WITH EXTENSIONS

CROSS REFERENCE TO RELATED APPLICATION

The present application is a division of application Ser. No. 09/536,401, filed on Mar. 28, 2000, now U.S. Pat. No. 6,342,744 entitled DIRECT CURRENT MOTOR USING MAGNETS WITH EXTENSIONS and is related to and incorporates herein by reference Japanese Patent Applications No. 11-142042 filed on May 21, 1999, No. 11-203769 filed on Jul. 16, 1999 and No. 11-270566 filed on Sep. 24, 1999.

BACKGROUND OF THE INVENTION

The present invention relates to direct current motors having permanent magnets.

A conventional direct current (d.c.) motor 20 is comprised of permanent magnets 21 and 22, an armature 23, a commutator 24, brushes 25 and the like as shown in FIGS. 13A to 13C. In this motor, the armature 23 rotates as shown in the order of FIGS. 13A, 13B and 13C, when direct current power is supplied thereto.

Specifically, the armature 23 has an armature core 26 and armature coils 27. A plurality of teeth 26*a* is formed on the core 26. Each coil 27 is wound around five teeth 26*a,* although only one is shown in the figures. The coils 27 are wound in a distributed winding form.

The commutator 24 has a plurality of segments 24*a* on which the brushes 25 slide, so that the direct current flows from the brushes 25 to the coils 27 through the segments 24*a* of a commutator. Thus, the armature 23 rotates in the clockwise direction (arrow X) in the figures, as the direction of current flowing in the coils 27 is reversed.

The current supplied to the coil 27 from the brush 25 is changed as shown in FIGS. 14A to 14C. It is assumed that the current I flows from right to left as shown in FIG. 14A, and that the commutator 24 moves to the right as shown in FIG. 14B relative to the brush 15 as the armature 23 rotates. The brush 25 bridges two adjacent segments 24*a* to supply the coil 27 with shorting current i. The current I flows from the left to the right in the coil 27 as shown in FIG. 14C, as the armature 23 rotates further. That is, the direction of the current I flowing in the coil 27 is reversed, when the armature 23 rotates as shown in the order of FIGS. 14A, 14B and 14C. In this instance, the current which changes by 2I from +I to −I is supplied from the brush 25.

FIGS. 14A to 14C correspond to FIGS. 13A to 13C. When the armature 23 rotates as shown in the order of FIGS. 13A, 13B and 13C, the direction of current I in the coil is reversed. The direction of the magnetic field in the core 26 wound with the core coil 27 is reversed. The rotating force is generated to rotate the armature 23 by the electromagnetic force of the coils 27 and the magnetic force of the magnets 21 and 22.

The reversion of current flowing in the coil 27 during the period of shorting by the brush 25 is defined as commutation. This relation is expressed in the following commutation equation.

$$L(di/dt)+e+Rci+R2(I+i)-R1(I-i)=0$$

In the above equation, L(di/dt) is a reactance voltage generated by an inductance of the coil 27 shorted by the brush 25, and e is an induction voltage generated in the coil 27 when the armature 23 rotates. Rc is a resistance of the coil

27 shorted by the brush 25. R1 and R2 are contact resistances between the brush 25 and the commutator 24. I is a current supplied form the brush 25, and i is a shorting current of the coil 27 shorted by the brush 25.

The shorting current i changes linearly as shown by the dotted line in FIG. 15, as long as the reactance voltage L(di/dt) of the coil 27 and the induction voltage e is negligible during the commutation period. In this instance, the commutation is effected linearly and most favorable.

However, the reactance voltage and the induction voltage are generated in the coil 27 in fact. The shorting current i therefore flows with a delay in time relative to the linear commutation characteristics as shown by the solid line in FIG. 15, resulting in an insufficient commutation. This insufficient commutation causes spark discharges at the rear end of the brush 25, when the commutation terminates. The spark discharges causes noise and brush wear.

It is proposed to counter this problem, that is, improve the commutation operation by moving the brush in the counterclockwise direction in FIG. 13. The brush is moved to reduce the influence of the induction voltage e. Specifically, the induction voltage e is generated as a counterelectromotive force in the coil 27 by changes in the magnetic flux amount Φ passing through the coil 27. This voltage e is expressed as follows.

$$e=-d\Phi/dt$$

That is, the induction voltage e is generated in proportion to the speed of reduction in the magnetic flux amount Φ passing through the coil 27.

The induction voltage e is shown in FIG. 16.

Specifically, FIG. 16 shows changes in the magnetic flux amount Φ passing through the coil 27 and hence passing through the core 26 (five teeth 26*a*) around which the coil 27 is wound, and the induction voltage e generated in the coil 27 in response to the change in the magnetic flux amount Φ. In FIG. 16, the magnetic flux amount Φ and the induction voltage e are shown with respect to a reference position (0°) which corresponds to FIG. 13B. That is, the reference position is defined as the position where the center of the core 26 (five teeth 26*a*) wound with the coil 27 coincides with the center of the magnet 21 or 22.

When no current flows in the coil 27, only the magnetic flux of the permanent magnets 21 and 22 passes through the coil 27. In this instance, the magnetic flux amount Φ is maximal when the rotation position of the armature 23 is at the reference position (FIG. 13B) as shown by (A) in FIG. 16.

When the current flows in the coil 27, however, it generates the magnetic force which influence the magnetic flux of the magnets 21 and 22. As a result, the magnetic flux amount Φ of the coil 27 changes with the rotation position of the armature 23 as shown by (B) in FIG. 16, because the current is reversed during the commutation period, that is, when the armature 23 rotates as shown in the order of FIGS. 13A, 13B and 13C. That is, the magnetic flux amount Φ changes from positive to negative, when the armature 23 passes through the reference position. As a result, the magnetic flux amount Φ which actually passes through the coil 27 changes as shown by (C) in FIG. 16. This amount is a sum of the flux amounts indicated by (A) and (B). Thus, the actual magnetic flux amount Φ becomes maximum before the armature 23 rotates to the reference position. As a result, the induction voltage e of the coil 27 changes from negative to positive when the total magnetic flux amount becomes the maximum. For this reason, the induction voltage e is generated in a manner to delay the commutation and delay the reversion of the shorting current i, causing the insufficient commutation.

Therefore, the influence of the induction voltage e in the coil 27 is minimized by moving the position of the brush 25 in the direction opposite the rotation of the armature 23, that is, in the counter-clockwise direction in FIG. 13. In practice, the position of the brush 25 is determined based on not only the induction voltage but also the reactance voltage.

It is however difficult to maintain good commutation operation, because the current flowing in the coil 27 and the rotation speed of the motor change from time to time. For instance, in the case of a blower motor used for an automotive air conditioner unit, the position where the total magnetic flux amount Φ attains the maximum moves to a position (negative side in FIG. 16) opposite the rotation direction at high load and high rotation speed conditions because more current is supplied. The induction voltage e caused by the total magnetic flux amount Φ also increases as the rotation speed increases. Further, the reactance voltage also increases as the current in the coil 27 increases. Thus, the brush need be moved more for good commutation operation. In the case of low load and low speed conditions, on the contrary, the brush need be moved less for good commutation operation. It is thus required to move the brush position from time to time.

SUMMARY OF THE INVENTION

The present invention therefore has an object to provide a direct current motor capable of attaining good commutation operation irrespective of loads.

According to the present invention, a direct current motor is comprised of an armature having a core and coils wound on the core, magnets arranged to face each other through the armature, a commutator operatively connected to the coils, and a brush for shorting each coil during a commutation period to reverse a direction of current in the coil. Each magnet has an extension at a circumferential end thereof to generate in the coil an induction voltage which counteracts to the reactance voltage. A commutation characteristics is improved to be sufficiently linearized. Preferably, the magnet has, at the extension, a varying thickness or magnetic pole orientation strength different from that of its main part. A visible member is provided on the axial end of the magnet.

BRIEF DESCRIPTION OF THE DRAWINGS

Other objects, features and advantages of the present invention will become more apparent from the following detailed description made with reference to the accompanying drawings. In the drawings.

DETAILED DESCRIPTION OF THE PREFERRED EMBODIMENT

The present invention will be described in detail with reference to various embodiments in which a direct current motor is designed as a blower motor for an automotive air conditioner unit. In the air conditioner unit, the current supplied to the motor is variably determined by a manual switch. Specifically, 18 amperes current and 4 amperes current are supplied to the motor when the manual switch is manipulated to a HI-position (high output) and LO-position (low output), respectively. The current determines the rotation speed of the motor and hence the amount of air supplied into the air conditioner unit.

(First Embodiment)

Figure 1:
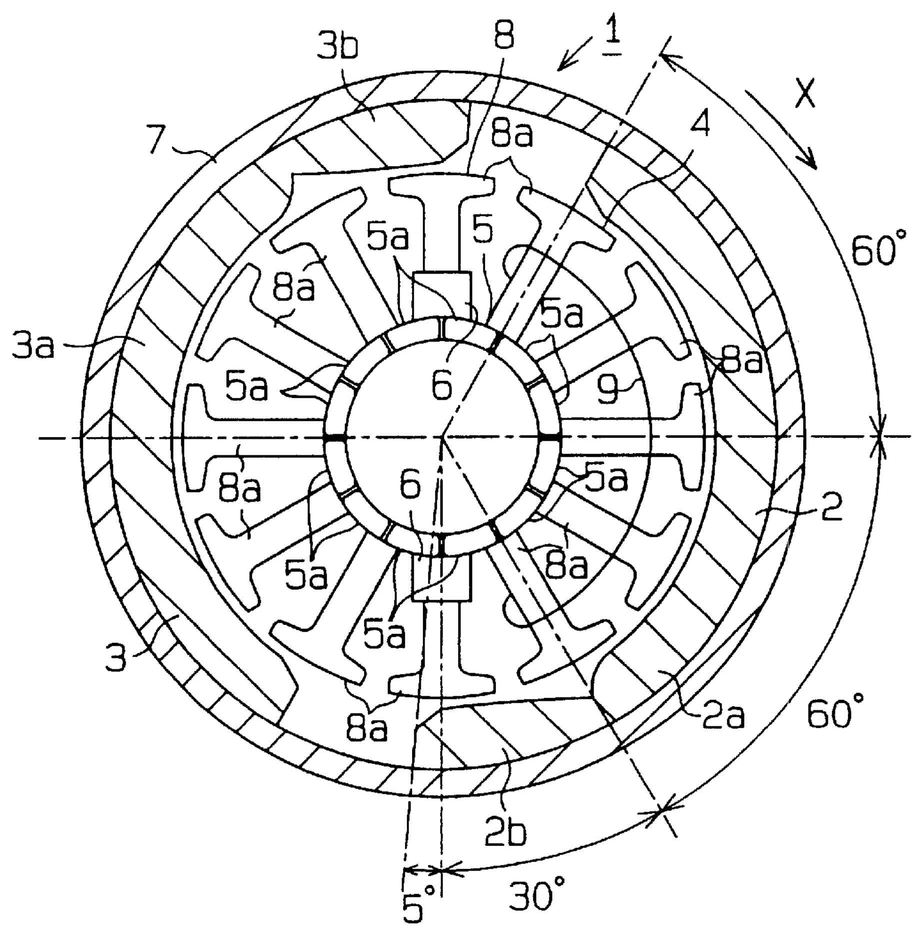
FIG. 1 is a schematic sectional view showing a direct current motor according to a first embodiment of the present invention.

Referring first to FIG. 1, a blower motor 1 is comprised of magnets 2 and 3, an armature 4, a commutator 5, brushes 6 and the like. The motor 1 is a two-pole direct motor. The magnets 2 and 3 which provide N-pole and S-pole are arranged around the armature 4 to face each other in a housing 7. The armature 4 has an armature core 8 and armature coils 9 wound around the core 8. The armature 4 rotates when the coils 9 are supplied with direct current. The core 8 is formed with a plurality of (twelve) teeth 8*a*. Each tooth 8*a* is spaced apart 30° in the circumferential direction from adjacent teeth. Although only one coil is shown in the figure, each coil 5 is wound on separate five of teeth 8*a* in the distributed winding form.

The commutator 5 is disposed at one axial side end of the core 8 and is comprised of a plurality of segments (commutator pieces) 5*a*. The brushes 6 are biased to slidably contact the commutator 5. The direct current is supplied from a direct current power source to flow from the brush 6 to the coil 9 through the segments 5*a* of the commutator 5. Thus, the armature 4 rotates in the clockwise direction (arrow X) in the figure, as the direction of current flowing in the coils 9 is reversed. In this embodiment, the direction of the current is reversed every 30° rotation of the armature 4 relative to the brush 6, because each segment 5*a* is provided every 30° in the circumferential direction. That is, the commutation of coils is effected every 30° rotation of the armature 4.

Figure 13A:
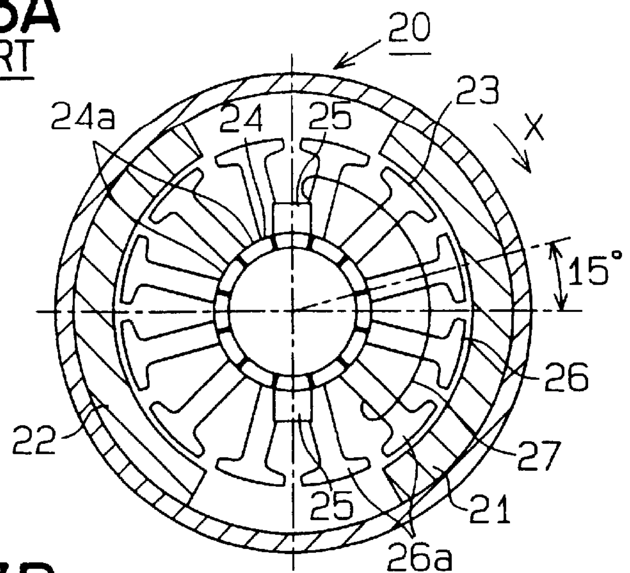
FIGS. 13A to 13C are schematic sectional views showing a conventional direct current motor.
Figure 13B:
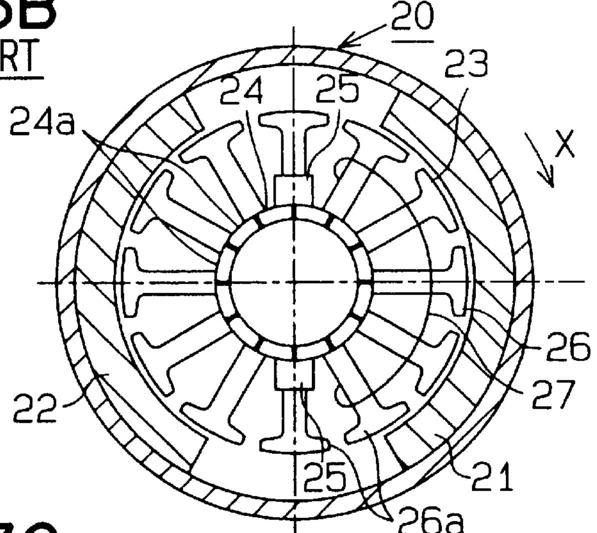
Figure 13C:
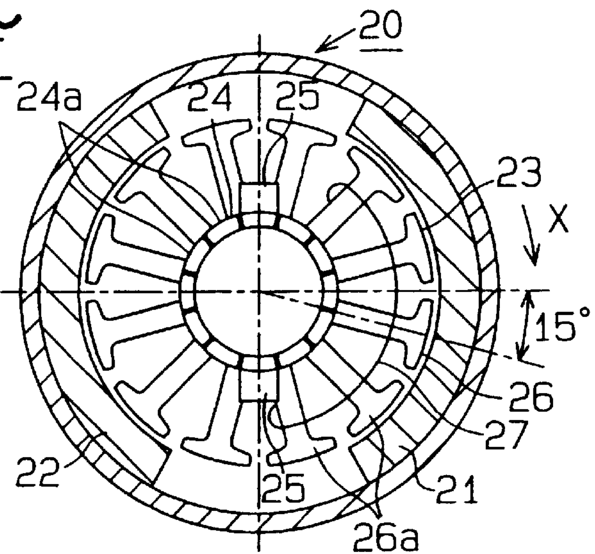
Figure 14A:
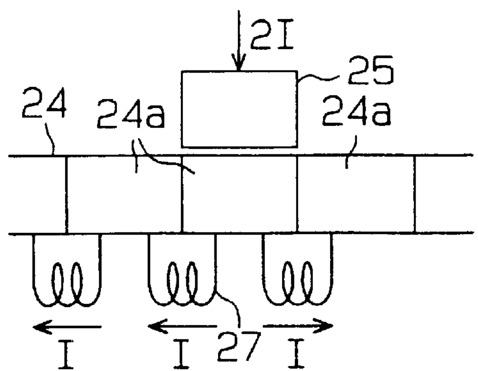
FIGS. 14A to 14C are schematic diagrams showing commutation operation of the conventional motor.
Figure 14B:
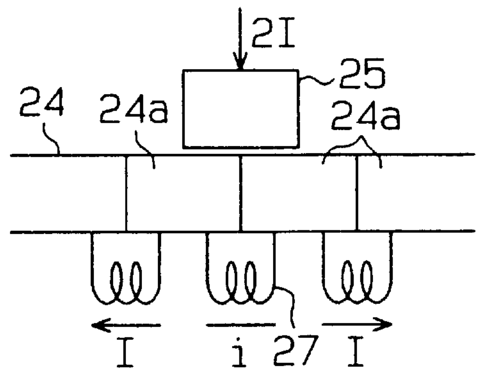
Figure 14C:
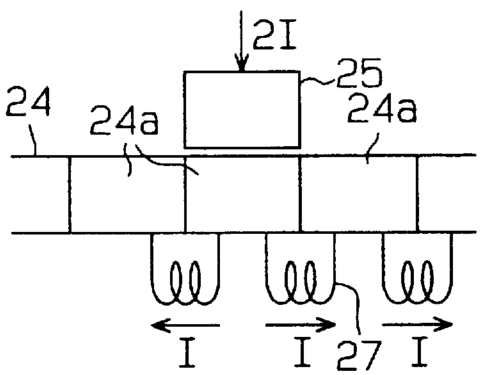

The magnets 2 and 3 have main magnetic pole parts 2*a* and 3*a* and extensions 2*b* and 3*b*, respectively. The main parts 2*a* and 3*a* correspond to the magnets 21 and 22 of the conventional motor (FIG. 13), respectively. The extensions 2*b* and 3*b* are provided at forward positions in the rotation direction, that is, at positions where each tooth 8*a* passes after passing the main parts 2*a* and 2*b,* respectively.

Figure 2:
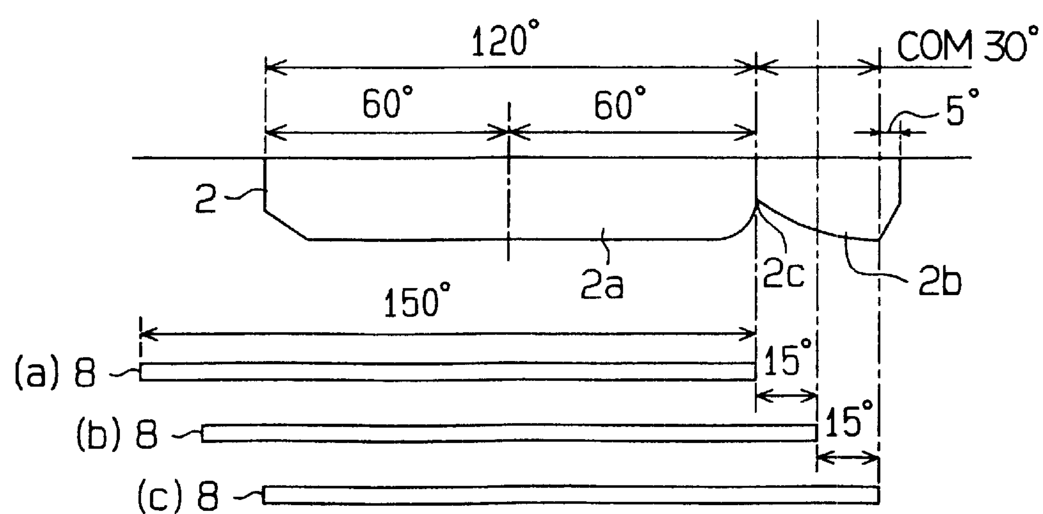
FIG. 2 is a schematic diagram showing a relation between a magnet and an armature in the first embodiment.

In FIG. 2, the magnet 2 is shown as straightened although it is in an arcuate shape. Further, the circumferential width of the magnet 2 is indicated in terms of angle and the core 8 (five teeth 8*a*) is shown to have 150° (30°×5). As understood from FIGS. 1 and 2, each main part 2*a,* 3*a* has a circumferential length which corresponds to the angular interval (120°) between the centers of the first and fifth teeth of five teeth 8*a* around which each coil 9 is wound. The center of commutation is defined as the rotation position of the armature 4 where the center of the main part of each magnet and the center (third teeth) of the five teeth 8*a* align as shown in FIG. 1. The direction of current of the coil 9 shorted by the brushes 6 is reversed at this position.

Each extension 2*b,* 3*b* is gradually thickened over the 30° angular interval from the end of the main part 2*a,* 3*a* in the rotation direction of the armature 4. It is gradually thinned over the 5° angular interval from the thickest part in the rotation direction of the armature 4. This 5° angular interval is not limitative but may be more or less, as long as the motor 1 produces a maximum performance.

Referring further to FIG. 2, the positional relation between magnet 2 and the core 8 (five teeth 8*a*) wound with the coil 9 is described with respect to the commutation period.

The commutation starts when the core 8 rotates to the position, where the top end of the core 8 align the thinned part 2*c* of the magnet 2 as shown by (a) in the figure. When the core 8 rotates 15° further as shown by (b), the core 8 reaches the center of commutation shown in FIG. 1. The direction of current is reversed at this position. The commutation ends, when the core 8 further rotates 15° and reaches the position shown by (c) in FIG. 2. That is, the commutation of coil 9 is effected during the angular interval 30° in the order of positions (a), (b) and (c). The extension 2*b* is gradually thickened during this commutation period of angular interval 30°.

Figure 3:
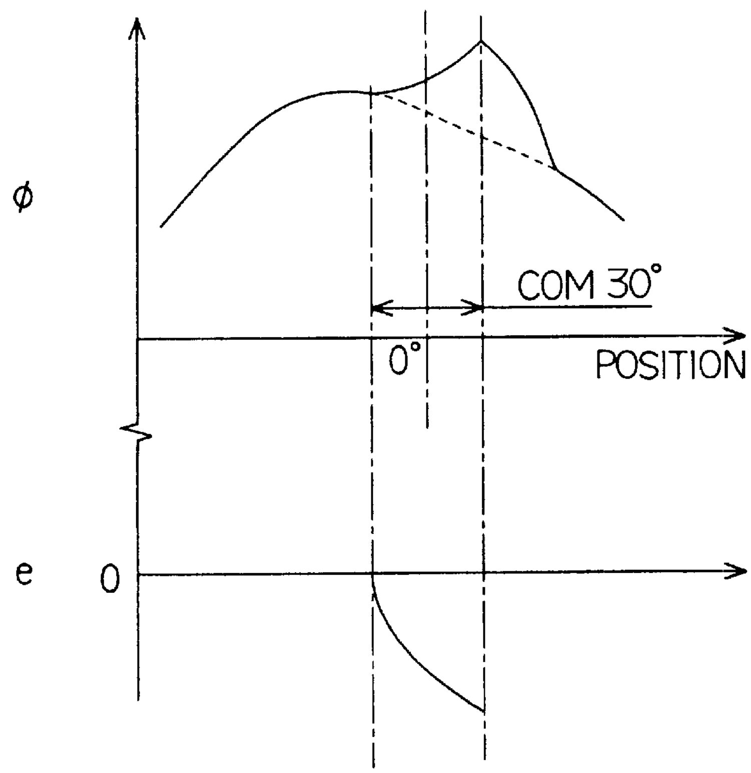
FIG. 3 is a graph showing magnetic flux amount and induction voltage relative to armature rotation positions in the first embodiment.
Figure 16:
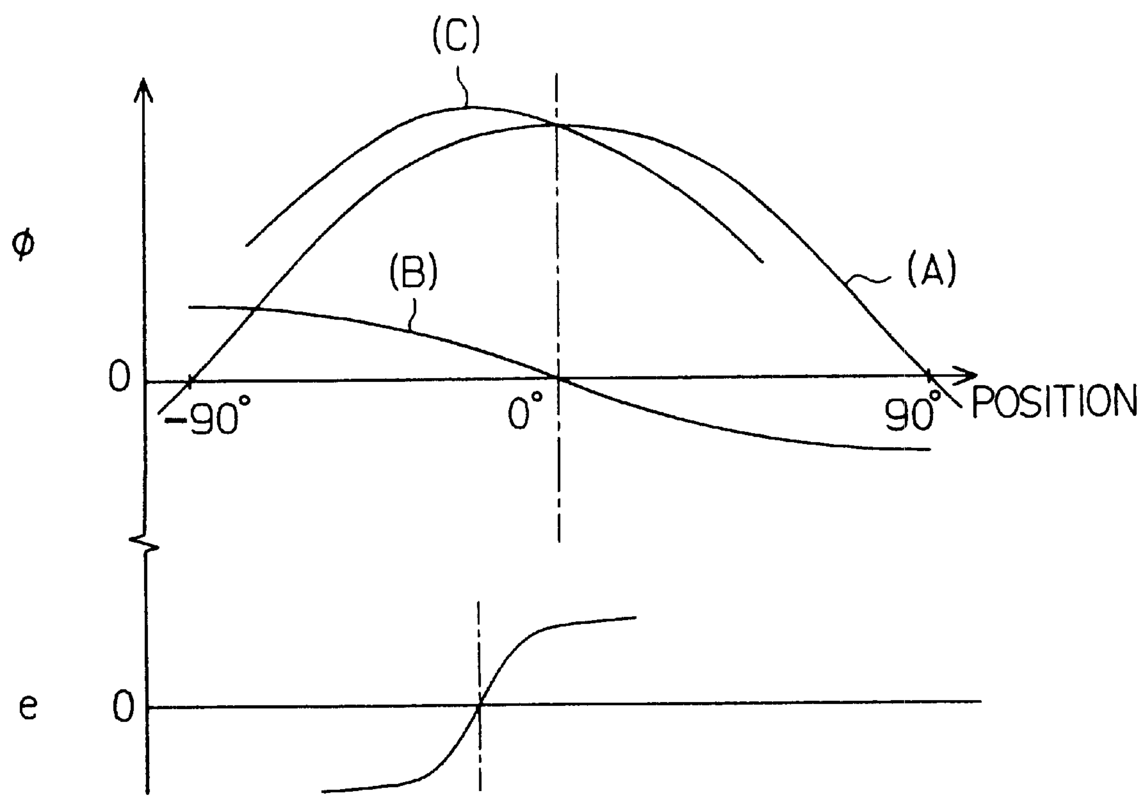
FIG. 16 is a graph showing magnetic flux amount and induction voltage relative to armature rotation positions in the conventional motor.

The magnetic flux amount Φ passing through the coil 9 under commutation is shown in FIG. 3. In this figure, the reference position 0° indicates the rotation position of the armature 4 shown in FIG. 1 in which the center of the core 8 (five teeth 8*a*) wound with the coil 9 and the center of the main part 2*a,* 3*a* align. As shown in FIG. 3, the magnetic flux amount Φ increases gradually as the armature 4 rotates. The rate of change in the magnetic flux amount Φ increases as the rotation speed of the armature 4 increases. The magnetic flux amount Φ indicates a sum of the magnetic flux generated by the current flowing in the coil 9 and the magnetic flux amount generated by the magnets 2 and 3. The dotted line in FIG. 3 shows the magnetic flux amount generated in the conventional motor and shown by (C) in FIG. 16.

Figure 15:
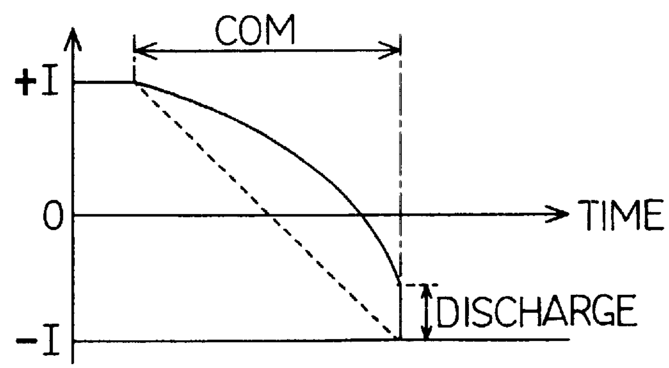
FIG. 15 is a graph showing commutation characteristics of the conventional motor.

Further, as shown in FIG. 3, the induction voltage e generated in the coil 9 is small during an initial period of commutation and gradually increases in the negative side as the armature 4 rotates. This induction voltage e counteracts to the reactance voltage and improves the insufficient commutation shown in FIG. 15. That is, the commutation characteristics is linearized as shown by the dotted line in FIG. 15 by generating the induction voltage e which completely corresponds to the reactance voltage. In the case that the load of the motor 1 is changed by the manual switch of the air conditioner, the current supplied to the coil 9 changes and the reactance voltage responsively increases and decreases. In this instance, however, the induction voltage e changes to counteract the reactance voltage in accordance with the motor load.

Specifically, the reactance voltage increases in accordance with the current of the coil 9, when the manual switch is manipulated to the HI-position to increase the current of the coil 9 to 18 amperes. In this instance, the motor rotation speed increases and the induction voltage e also increases. The reactance voltage decreases in accordance with the current of the coil 9, when the manual switch is manipulated to the LO-position to decrease the current to 9 amperes. In this instance, the motor rotation speed decreases and the induction voltage e also decreases. Thus, although the reactance voltage changes with the motor load, the induction voltage e also changes to cancel out the reactance voltage. As a result, good commutation can be effected even when the motor load changes.

As described above, according to the first embodiment, the induction voltage is generated counteract the reactance voltage in accordance with the motor load without moving the brush. Specifically, the commutation characteristics is linearized. As a result, the brush sparks can be restricted, resulting in the reduction of noise and brush wear. Thus, good commutation can be maintained irrespective of changes in the motor load. As the motor 1 can be operated stably, the air conditioner unit can be operated appropriately with the appropriate rotary driving force. As the brush sparks are restricted, special measures for noises caused by the sparks are not necessitated. The commutation performance can be improved with ease by changing the shape of the magnets 2 and 3.

(Second Embodiment)

Figure 4:
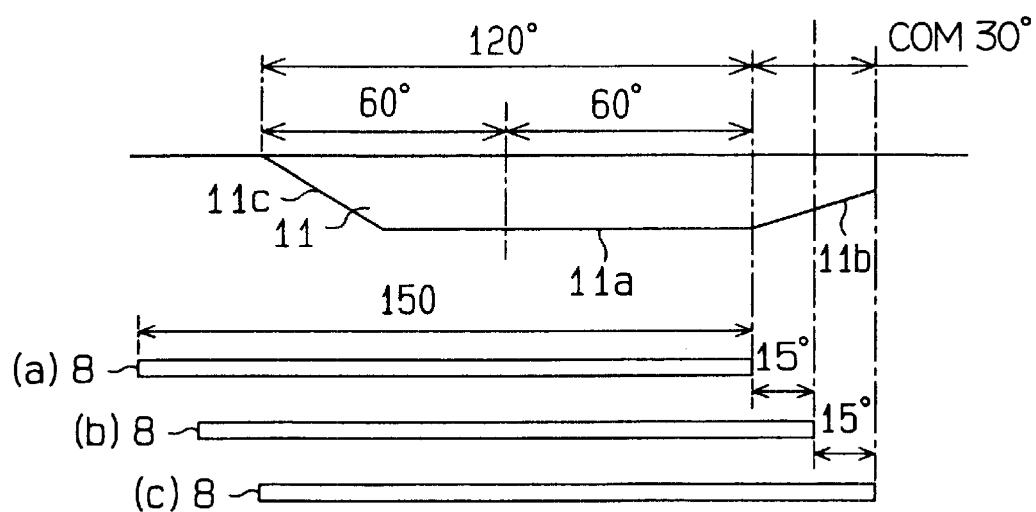
FIG. 4 is a schematic diagram showing a relation between the magnet and the armature in a second embodiment of the present invention.

In the second embodiment, each magnet 2, 3 shown in FIGS. 1 and 2 are replaced with a magnet 11 shown in FIG. 4. The magnet 11 is shown as straightened form in this figure, although it is actually in an arcuate shape.

As shown in FIG. 4, the magnet 11 has a main part 11*a* and an extension 11*b* extended from one end of the main part 11*a* in the direction of rotation of the core 8. The extension 11*b* has a circumferential length which corresponds to an angular interval of 30°. It is gradually thinned in the direction of rotation of the core 8. The main part 11 has the other end 11*c* which is gradually thinned in the direction opposite the direction of rotation of the core 8. The rate of thinning relative to the circumferential length is less at the end 11*b* than at the extension 11*c.*

Figure 5:
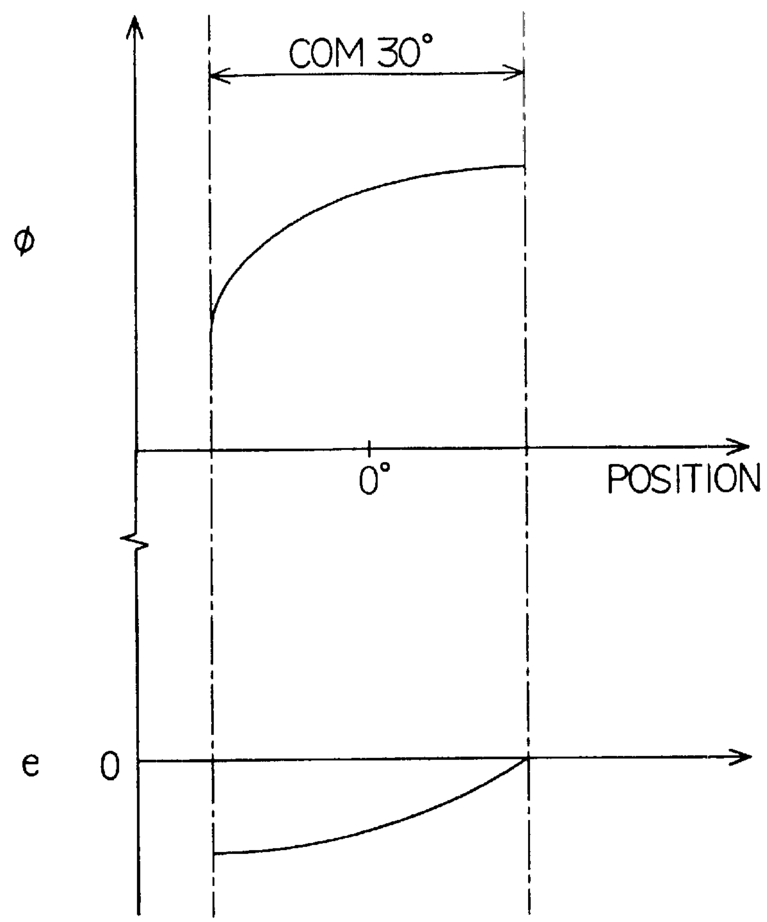
FIG. 5 is a graph showing magnetic flux amount and induction voltage relative to armature rotation positions in the second embodiment.
Figure 6:
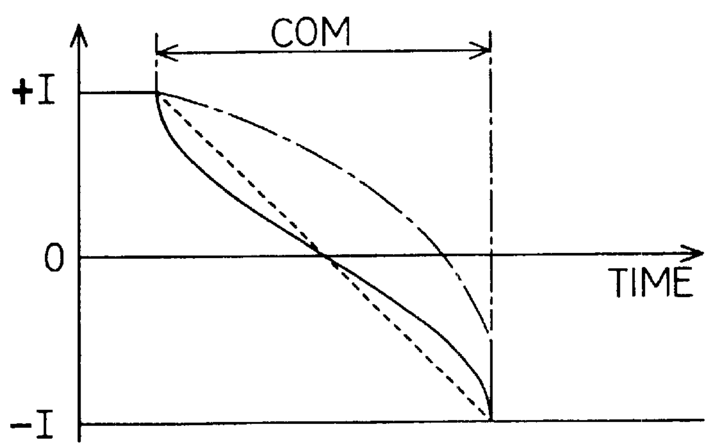
FIG. 6 is a graph showing commutation characteristics.

The magnetic flux amount Φ passing through the coil 9 increases as shown in FIG. 5 during the commutation period in which the core 8 rotates in the order of (a), (b) and (c). The rate of increase in the magnetic flux amount Φ relative to the rotation of the armature 4 is maximum at the initial period of commutation, and gradually decreases with the rotation of the armature 4. As a result, the induction voltage e generated in the coil 9 is maximum in the negative side at the initial period of commutation, and reaches 0 at the end of the commutation period after gradually increasing from the negative maximum. This induction voltage e also cancels out the reactance voltage. That is, as shown in FIG. 6, the commutation characteristics is improved as shown by the solid line relative to the insufficient commutation shown by the one-dot chain line. This characteristics is sufficiently close to the most desired commutation characteristics shown by the dotted line.

The above second embodiment also provides the same advantages as the first embodiment. Further, the magnet 11 can be produced with ease because it needs be thinned simply at its circumferential ends.

(Third Embodiment)

Figure 7:
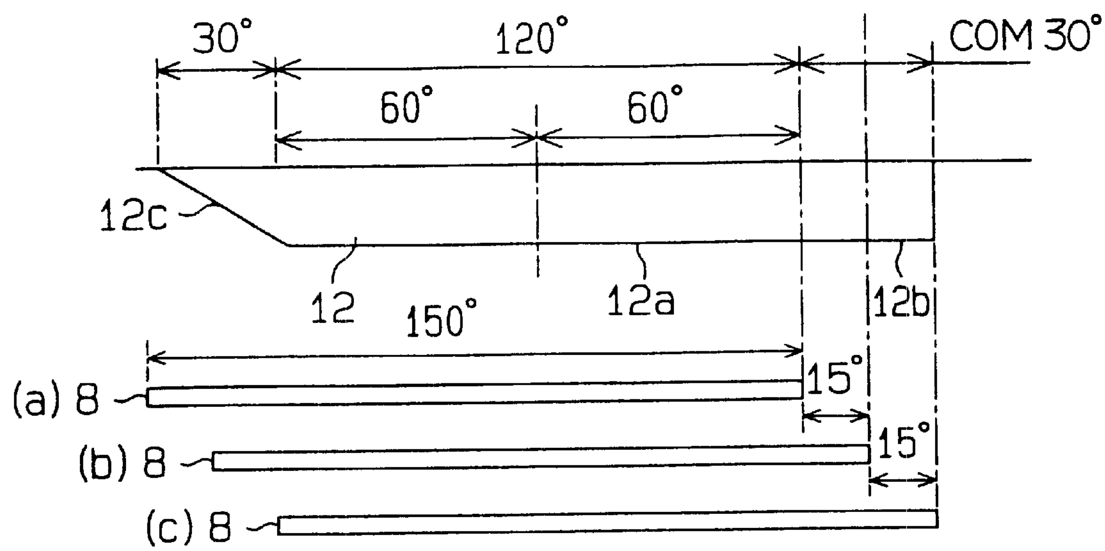
FIG. 7 is a schematic diagram showing a relation between the magnet and the armature in a third embodiment of the present invention.

In the third embodiment, a magnet 12 arcuate in shape is formed with extensions 12*b* and 12*c* at both circumferential ends of a main part 12*a* as shown in FIG. 7. Each extension 12*b,* 12*c* has a circumferential length which corresponds to the angular interval of 30° for commutation. The extension 12*b* has the same uniform thickness as the main part 12*a,* while the extension 12*c* is thinned gradually in the direction opposite the direction of rotation of the core 8. In this embodiment also, the magnetic flux amount Φ changes in the similar manner as shown in FIG. 5 during the commutation period in which the core 8 rotates in the order of (a), (b) and (c). The reactance voltage is cancelled out by the induction voltage e generated by changes in the magnetic flux amount Φ and the commutation characteristics is improved as shown by the solid line in FIG. 6.

(Fourth Embodiment)

Figure 8:
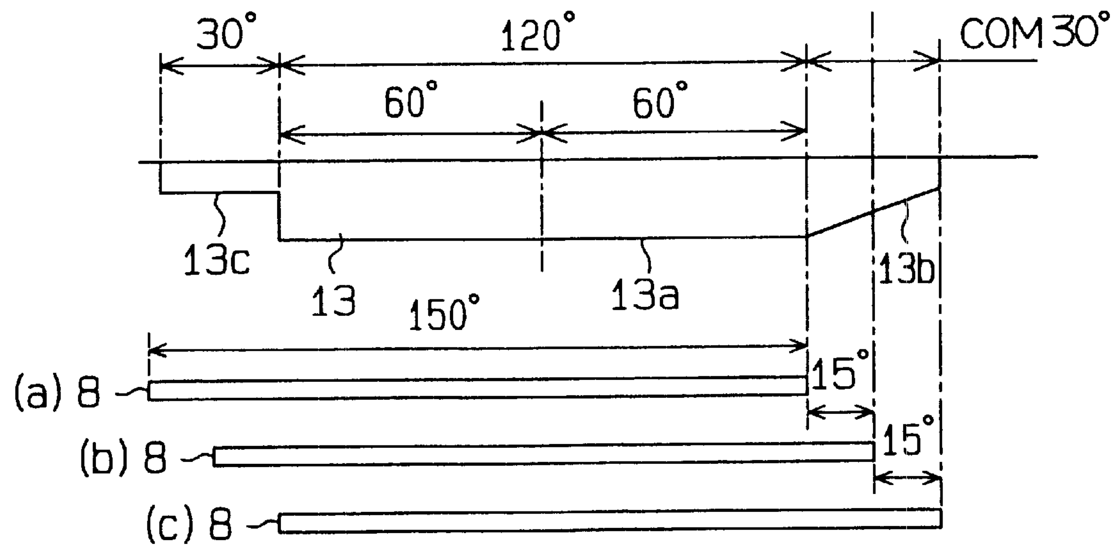
FIG. 8 is a schematic diagram showing a relation between the magnet and the armature in a fourth embodiment of the present invention.

In the fourth embodiment, a magnet 13 arcuate in shape is formed with extensions 13*b* and 13*c* at both circumferential ends of a main part 13*a* as shown in FIG. 8. Each extension 13*b,* 13*c* has a circumferential width which corresponds to the angular interval of 30° for commutation. The extension 13*b* is gradually thinned in the direction of rotation of the core 8, while the extension 13*c* has a uniform thickness less than that of the core 8. In this embodiment also, the magnetic flux amount Φ changes in the similar manner as shown in FIG. 5 during the commutation period in which the core 8 rotates in the order of (a), (b) and (c). The reactance voltage is cancelled out by the induction voltage e generated by changes in the magnetic flux amount Φ, and the commutation characteristics is improved as shown by the solid line in FIG. 6.

(Fifth Embodiment)

Figure 9:
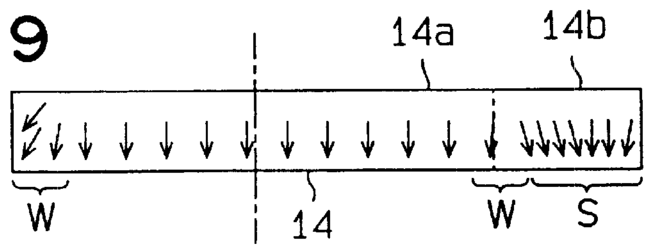
FIG. 9 is a schematic view showing the magnet used in a fifth embodiment of the present invention.
Figure 10:
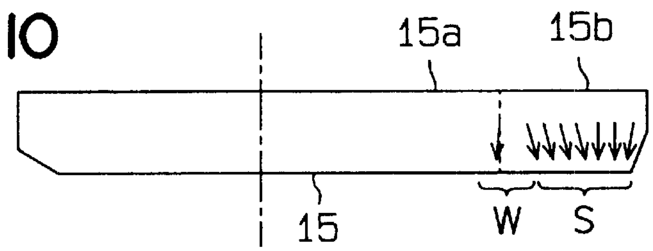
FIG. 10 is a schematic view showing the magnet used in a sixth embodiment of the present invention.

In the fifth embodiment, a magnet 14 arcuate in shape is formed to have the same uniform thickness throughout a main part 14*a* and an extension 14*b* as shown in FIG. 9. However, strength of magnetic dipole orientation in the extension 14*b* is differentiated from that in the main part 14*a.* That is, the magnet 14 is magnetized to have a strong orientation part S and weak orientation part W. The orientation is stronger in the extension 14*b* than in the main part 14*a,* thereby generating the induction voltage e to counteract to the reactance voltage.

It is also possible to change strength of magnetization of the magnet to have strong magnetization and weak magnetization.

(Sixth Embodiment)

In the sixth embodiment, a magnet 15 is shaped to have a main part 15*a* and an extension 15*b*. That is, the extension 15*b* is thinned at its end opposite the main part 15*a,* and the orientation is strengthened in the extension.

(Seventh Embodiment)

In the case of such a magnet 14 having the uniform thickness as in the fifth embodiment (FIG. 9), it may be difficult to distinguish the extension 14*b* from the main part 14*a* from its outer configuration. The magnet 14 is likely to be assembled to the housing 7 in reverse. Further, the cummutation performance cannot be improved, if the magnet 14 is displaced from its right position in the assembling process.

Figure 11:
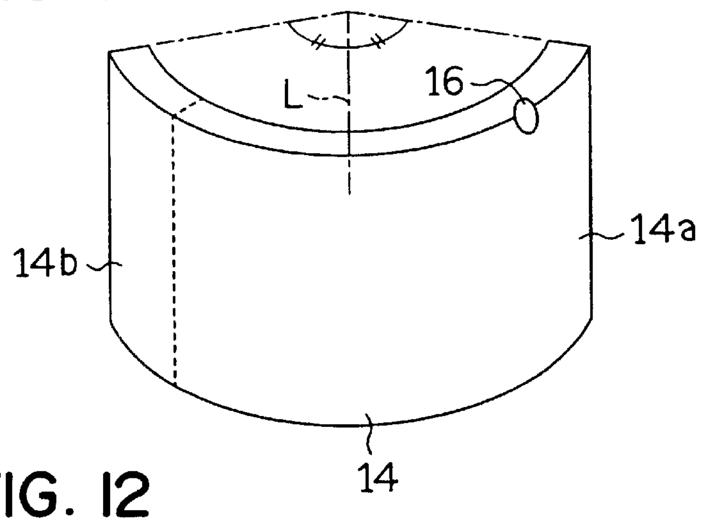
FIG. 11 is a perspective view showing the magnet used in a seventh embodiment of the present invention.

Therefore, in the seventh embodiment, a recess or concavity 16 is formed on the arcuate magnet 14 to be visible externally as shown in FIG. 11. It is preferably provided at a position displaced from the central line (circumferential center) L of the magnet within the range of the main part 14*a*. This recess 16 can be formed in the magnet molding process. It is preferred that the recess 16 is provided on the corner where the axial side end surface and the planar outer peripheral surface cross, so that it may be recognized externally even after the assembling process. The recess 16 may be replaced with a protrusion or convexity. The recess 16 or protrusion should be sized and positioned not to influence the magnetic flux amount of the magnet 14 nor lessen the mechanical strength.

(Eighth Embodiment)

Figure 12:
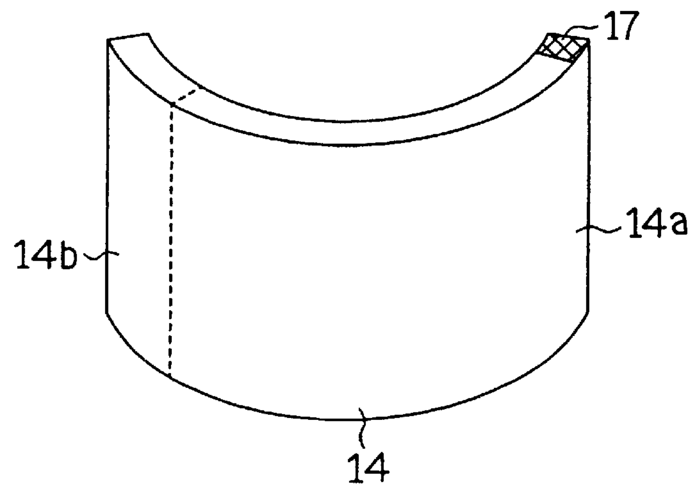
FIG. 12 is a perspective view showing the magnet used in an eighth embodiment of the present invention.

In the eighth embodiment, a colored marking 17 is provided by printing or the like as shown in FIG. 12. The marking 17 is provided on the circumferential end of the side end surface of the magnet 14.

In the foregoing embodiments, the extensions may be formed into different shapes as long as the commutation characteristics is generally linearized. For instance, the extensions may be a shape so that the current may change smoothly, that is, the commutation may be effected in a sine-wave characteristics, at the start and end of the commutation. The recess, protrusion and marking may also provided on the magnets used in the first to fourth embodiments (FIGS. 1 to 8).

Further modifications and alterations are also possible without departing from the spirit of the invention.

What is claimed is:

1. A direct current motor comprising:

an armature having a core and coils wound on the core;

magnets arranged to face each other through the armature;

a commutator operatively connected to the coils; and a brush disposed in sliding contact with the commutator for shorting each coil during a commutation period to reverse a direction of current in the coil, wherein each magnet has a main part and an extension part at an end of the main part to generate in the coil an induction voltage that counteracts a reactance voltage, wherein the main part and the extension part have a similar uniform thickness;

wherein a magnetization in the extension part at an end side in a rotation direction of the armature is stronger than that at a boundary part between the main part and the extension part, and wherein a magnetic dipole orientation in the main part is directed to a rotation axis of the armature, a magnetic dipole orientation in the boundary part between the main part and the extension part is directed to a radially outer side from the rotation axis of the armature and a magnetic dipole orientation in the end side of the extension part is directed to the rotation axis of the armature.

2. The direct current motor of claim 1, wherein each magnets have thinned ends at both terminal ends.

3. The direct current motor of claim 1, wherein the magnet has a visible member thereon at a location other than a planar surface, which is attached to a housing.

4. The direct current motor of claim 3, wherein the visible member is provided at a position deviated from a center of the magnet in a circumferential direction.

5. The direct current motor of claim 4, wherein the visible member is provided within a range of the main part.

6. The direct current motor of claim 4, wherein the visible member is provided at one terminal end of the magnet.

7. The direct current motor of claim 4, wherein the visible member is a recess.

8. The direct current motor of claim 4, wherein the visible member is a colored marking.

9. The direct current motor of claim 1, wherein the extension part extends respective angular ranges each of which includes a commutation interval.

10. The direct current motor of claim 1, wherein the extension part extends respective angular ranges each of which corresponds to an angular interval between two adjacent teeth of the armature on which the coils are wound.

11. A direct current motor comprising:

an armature having a core and coils wound on the core;

magnets arranged to face each other through the armature;

a commutator operatively connected to the coils; and a brush disposed in sliding contact with the commutator for shorting each coil during a commutation period to reverse a direction of current in the coil, wherein each magnet has a main part and an extension part at an end of the main part to generate in the coil an induction voltage that counteracts a reactance voltage, and wherein a magnetization in the extension part at an end side in a rotation direction of the armature is stronger than that at a boundary part between the main part and the extension part wherein the magnetic dipole orientations in the main part and in the extension part are respectively and substantially directed toward a rotational axis of the armature.

12. A direct current motor comprising:

an armature having a core and coils wound on the core;

magnets arranged to face each other through the armature;

a commutator operatively connected to the coils; and a brush disposed in sliding contact with the commutator for shorting each coil during a commutation period to reverse a direction of current in the coil, wherein each magnet has a main part and an extension part at an end of the main part to generate in the coil an induction voltage that counteracts a reactance voltage, and wherein a magnetic dipole orientation in the main part is directed to a rotation axis of the armature, a magnetic dipole orientation in a boundary part between the main part and the extension part is directed to a radially outer side from the rotation axis of the armature and a magnetic dipole orientation in an end side of the extension part is directed to the rotation axis of the armature.

* * * * *